United States Patent

[11] 3,607,086

| [72] | Inventor | George W. Dingus |
| | | 1821 Mary Ellen St., Pampa, Tex. 79065 |
| [21] | Appl. No. | 13,332 |
| [22] | Filed | Feb. 24, 1970 |
| [45] | Patented | Sept. 21, 1971 |
| | | Continuation-in-part of application Ser. No. 796,146, Feb. 3, 1969, now Patent No. 3,528,785. |

[54] APPARATUS FOR WET-PELLETIZING CARBON BLACK
2 Claims, 1 Drawing Fig.

[52] U.S. Cl. .................................................. 23/252, 23/259.9, 23/314, 165/90, 263/25, 34/183, 165/91
[51] Int. Cl. .................................................. B01f 7/04, C01b 31/14, B01j 2/00
[50] Field of Search ........................................ 23/313, 314, 269, 259.9, 252; 165/89, 90, 91, 92, 93; 263/25; 18/1; 34/179–183

[56] References Cited
UNITED STATES PATENTS

| 900,787 | 10/1908 | Schreck | 263/25 X |
| 2,420,810 | 5/1947 | Bray | 23/314 X |
| 2,642,343 | 6/1953 | Studebaker | 23/314 |
| 2,751,301 | 6/1956 | Leslie | 23/313 X |
| 2,774,654 | 12/1956 | Reed | 23/269 X |
| 2,787,599 | 4/1957 | Belden | 23/269 X |
| 2,900,668 | 8/1959 | Hubner | 23/313 X |
| 2,946,572 | 7/1960 | Annis | 263/25 X |
| 3,019,093 | 1/1962 | Gholson | 23/314 |
| 3,032,390 | 5/1962 | Count | 23/313 X |
| 3,390,424 | 7/1968 | Fortune | 23/314 X |

*Primary Examiner*—Norman Yudkoff
*Assistant Examiner*—S. J. Emery
*Attorneys*—Kenneth W. Brown, Arthur S. Collins, Barry R. Blaker and Lawrence A. Chaletsky ABSTRACT: A wet pelletizer apparatus suitable for the preparation of carbon black pellets wherein heating of the pelletizer during agitation of the carbon black is accomplished by external heating means.

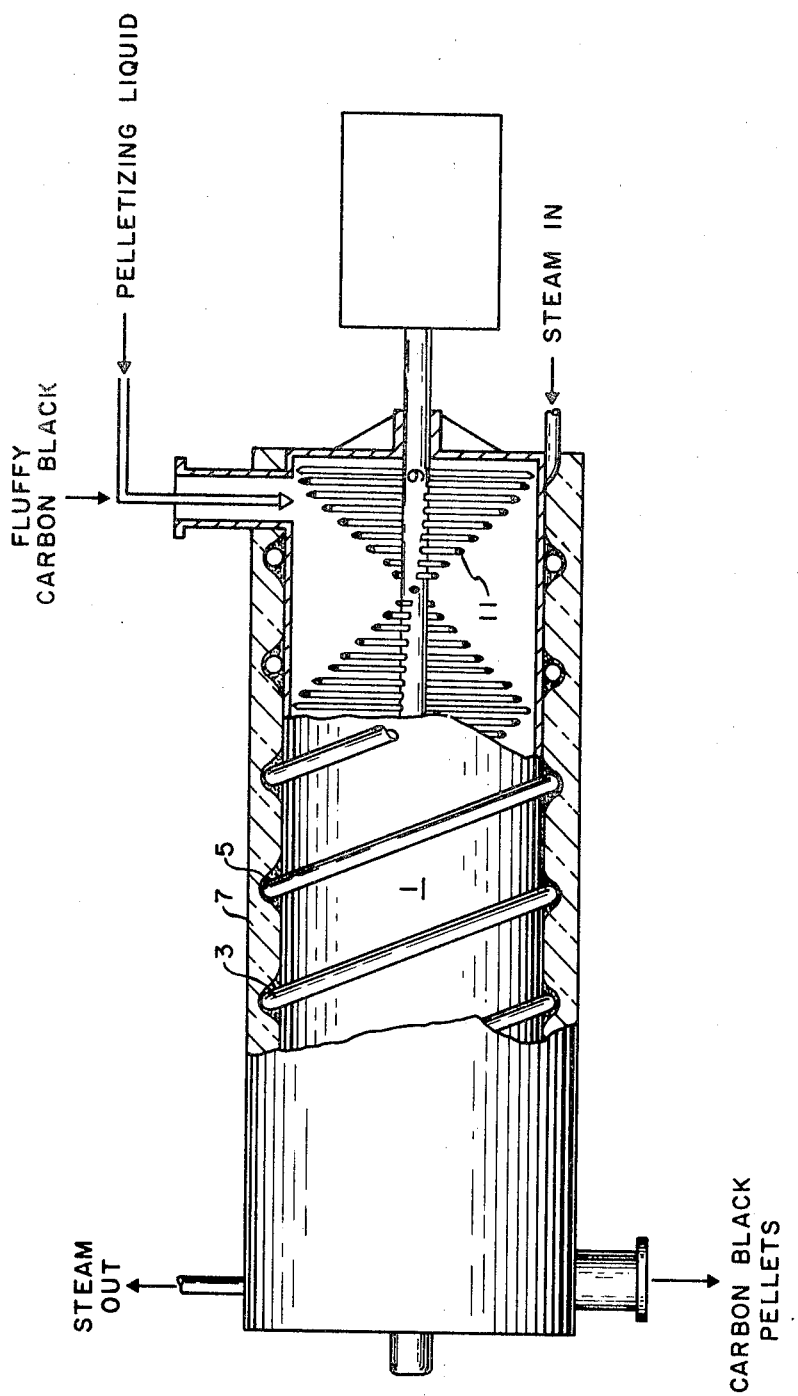

APPARATUS FOR WET-PELLETIZING CARBON BLACK

This application is a continuation-in-part of copending application Ser. No. 796,146, filed Feb. 3, 1969 now U.S. Pat. No. 3,528,785.

This invention relates to the art of wet-pelletizing carbon black, and more particularly to an apparatus for carrying out the pelletizing process in which caking of the materials on the walls of the pelletizer with consequent obstruction of the pelleting zone is minimized and even eliminated entirely.

The conversion of dusty, pulverulent materials into beads or pellets of increased density, cohesive strength and nondusting characteristics has been practiced in the carbon black art for several decades. Among the earliest U.S. patents pertaining to this art are those of Heller and Snow, Nos. 2,131,689 and 2,306,698.

As described in those and in a plethora of subsequently issued patents carbon black is wetted, usually with an equal amount by weight of water, and agitated by stirring in an elongated trough or tub. The stirring means are metal pins secured helically along a metal shaft mounted for horizontal rotation in the axis of the trough.

Carbon black becomes very viscous and sticky when wet and compaction causes adhesion not only of particle to particle also of particles to other surfaces, notably the walls of the tube or trough. In fact, a heavy cake builds up almost immediately after startup of the process which cake would soon completely obstruct the flow of the black through the tube but for the scraping action of the rotating pins. Obviously, the resistance of the wall cake necessitates additional power to rotate the pin shaft. Additionally, chunks of cake occasionally break away from the mass, momentarily reducing resistance to rotation and at other times especially thick accretions of cake impose exceptionally heavy loads on the drive, both causing uneven surges in operation. The continuous deposition of wet powder on the walls and its continuous removal by the pin tips often sets up severe vibration in the pins and shaft with accompanying high stresses which frequently cause pins, and sometimes shafts, to break. These spells of "shuddering" consume exceptionally large quantities of power.

Although wet pelletization has been carried out commercially for more than 30 years no successful means have heretofore to my knowledge been devised to eliminate formation of wall cake in wet pelletizers. Accordingly, it is the principal object of my invention to provide a wet pelletizer apparatus for the pelletization of carbon black wherein heat is externally provided so as to minimize or prevent caking on the walls thereof.

It is a further object of my invention to provide a novel process for carrying out wet pelletization of carbon black in which cake is inhibited from becoming established on the walls of the pelletizer.

It is another object of this invention to provide apparatus for eliminating or minimizing the deposition of cake on the pelletizer walls.

The objects of this invention are accomplished by heating the walls of the pelletizer to a temperature sufficiently high that the carbon black being pelleted is prevented from adhering to the wall in any appreciable quantity for any appreciable period of time.

The means by which such heating is accomplished are not critical in the sense that any system for applying and maintaining the heat at a reasonably uniform level will suffice. Thus, steam tracing or electrical heating elements secured to the wet pelletizer wall will serve the purpose. However, such means are either difficult to attach to the pelletizer or expensive to operate and hence my preferred apparatus is a water jacket. Ordinarily, caking is satisfactorily inhibited at hot water temperature and, in fact, a consistent temperature as low as about 150° F. is satisfactory. Preferably, the temperature will be maintained in the range between about 160°–190° although there appears to be no upper limit except that the temperature should be held below the degradation temperature of the product. Such degradation temperature is never attained when hot water is used and, in any event, there is no advantage obtained from raising the temperature above that obtained with hot water.

It is, of course, desirable that the water jacket enclose the entire area of the cylindrical tube up to the level of the bed of material being pelleted, i.e., up to the level at which cake is customarily otherwise deposited. Although it is not essential that the jacket run the full length of the cylindrical tube, it is advantageously installed over the full length of the wet pelletizer to ensure trouble-free operation throughout.

The invention will be further described and illustrated with reference to the accompanying drawing wherein there is shown diagrammatically a wet pelletizer suitable for carrying out the process of the present invention. More complete reference to the wet pelletizer is made as follows.

In the following examples, operations of a conventional wet pelletizer with and without utilization of my invention are compared. The pelletizer employed in the operation described in example 1 consisted of a horizontal cylindrical tube 130 inches in diameter and 8 feet in length. The axial shaft 9 was equipped with a total of 250 pins 11 spaced apart by a distance of three-fourths inch and deployed in two helices along the length of the shaft which was rotated at 390 r.p.m. All of the pins were initially bevelled to a chisel point, the edge of the point being in a plane perpendicular to the axis of the shaft.

EXAMPLE 1

A newly equipped wet pelletizer operating at a throughput rate of 2,100 pounds of high structure HAF carbon black and 2,100 pounds of pelletizing water per hour at ambient temperature developed the usual wall cake almost immediately after startup. At the end of 6 weeks' continuous operation the load on the 40 hp. drive motor became so great that the circuit breaker began kicking out regularly. Furthermore, the pins near the inlet end were worn down half an inch and below the bevelled part. At this point operation was stopped, the pelletizer was cleaned out and all of the worn pins were resharpened. When the cleaned apparatus was restarted the motor load was 28 amperes (15.7 hp.) and during 3 days of continuous operation cake built up and the load increased to 44 amperes (33.2 hp.).

At this point steam heat was applied to the exterior of the cylindrical tube 1 through a serpentine 3 of approximately 100 feet of copper tubing bonded to the shell with conductive cement 5 and covered with insulation 7. Within about 1 hour of heated operation the motor load had dropped to 28 amperes (17 hp.) and the cake had largely disintegrated.

After 19 weeks of such operation, inspection of the pelletizer showed that very little pin wear had occurred, less than one-eighth inch on the leading edge and less than one-sixteenth inch on the trailing edge of the pin, which was to be expected from unavoidable abrasion in a loose bed of carbon black. The wall of the cylindrical tube remained substantially free from cake.

Steam consumption during this run amounted to 60 pounds per hour under a pressure of 109 p.s.i.g.

EXAMPLE 2

Another pelletizer as above described but only 20 inches in diameter was fitted with a ½-inch annular jacket encompassing the entire area of the tubular housing. The jacket was made of 16-gauge-type 304 stainless steel and was equipped with baffles to provide good distribution of flowing water. The apparatus was first operated without application of heat during which time cake built up in the usual manner. The 20 hp. drive motor was then drawing 15 to 20 amperes (12 to 16 hp.) and the usual frequent and severe surges in amperage were experienced. Without removing the heavy serrated cake or changing operation in any other way, hot water was continuously introduced into the jacket at a temperature of about 165° F. and at a rate of 9 gal. per minute. Its return temperature was about 157°, for a calculated heat flow of 33,600 B.t.u. per hour. Within 2 hours of first application of heat, current flow had dropped to 10 a. (7.5 hp.) and remained at that level continuously thereafter with only occasional and minor surges upward. Subsequent inspections revealed that all cake had completely disappeared and from the steady-state current flow it was evident that no new cake was being formed.

It is apparent from the forgoing examples and from my experience that the process and apparatus of my invention have not only provided improved wet pelletizer operation but have also reduced costs of operation by reason of greatly reduced pin wear and low power requirements. For example, on a single machine power consumption was reduced by 87 kw.-hr. per day.

I claim:

1. In apparatus for wet-pelleting carbon black comprising an insulated substantially horizontal housing, a rotatable shaft centrally axially mounted therein having helically arranged radially extending agitator pins, feed means to supply carbon black and feed means to supply agglomerating liquid to one end of said housing, and outlet means to remove pelleted carbon black from the other end of said housing, the improvement which comprises means to heat the wall of said housing over substantially the entire exterior surface thereof, said heating means comprising a helical coil of hollow metal tubing bonded to the outside of said wall by means of conductive adhesive and containing a flowing hot liquid.

2. An apparatus as defined in claim 1 wherein the flowing hot liquid is water.